US007289624B2

(12) United States Patent
Brown et al.

(10) Patent No.: US 7,289,624 B2
(45) Date of Patent: Oct. 30, 2007

(54) MANAGING USE OF EXPERTS BY CALLERS WAITING IN A HOLD QUEUE

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 11/159,024

(22) Filed: Jun. 22, 2005

(65) Prior Publication Data

US 2005/0238163 A1 Oct. 27, 2005

Related U.S. Application Data

(62) Division of application No. 10/015,383, filed on Dec. 12, 2001, now Pat. No. 7,139,390.

(51) Int. Cl.
*H04M 3/00* (2006.01)
(52) U.S. Cl. .............................. 379/265.02; 379/265.11; 379/266.01; 379/309; 713/155; 713/170
(58) Field of Classification Search ........... 379/265.04, 379/265.01, 265.09; 713/155, 170
See application file for complete search history.

(56) References Cited

U.S. PATENT DOCUMENTS

| 4,953,204 A | 8/1990 | Cuschleg, Jr. et al. ...... 379/266 |
|---|---|---|
| 5,014,298 A | 5/1991 | Katz ............................ 379/93 |
| 5,311,574 A | 5/1994 | Livanos ........................ 379/88 |
| 5,444,774 A | 8/1995 | Friedes ........................ 379/266 |
| 5,499,288 A | 3/1996 | Hunt et al. .............. 379/88.02 |
| 5,561,707 A | 10/1996 | Katz ............................ 379/88 |
| 5,572,587 A | 11/1996 | Gaglani ....................... 379/266 |
| 5,673,404 A | 9/1997 | Cousins et al. ............. 395/809 |
| 5,790,637 A | 8/1998 | Johnson et al. .......... 379/88.04 |
| 5,864,617 A | 1/1999 | Donnelly ..................... 379/266 |
| 5,867,572 A | 2/1999 | MacDonald et al. ........ 379/266 |
| 5,903,642 A | 5/1999 | Schwartz et al. ........... 379/309 |
| 5,905,793 A | 5/1999 | Flockhart et al. ........... 379/266 |
| 5,915,001 A | 6/1999 | Uppaluru ................. 379/88.22 |

(Continued)

FOREIGN PATENT DOCUMENTS

EP 0585004 A2 3/1994

(Continued)

*Primary Examiner*—Quynh H. Nguyen
(74) *Attorney, Agent, or Firm*—Mark S. Walker; Amy J. Pattillo

(57) ABSTRACT

A method, system, and program for managing use of experts by callers waiting within a hold queue are provided. First, a call on hold in a hold queue is transferred to an expert system responsive to a request by the caller to speak with an expert. Then, responsive to detecting an answer by a party at the expert system, an authentication of the identity of the answering party is required. If the authenticated identity of the answering party matches an expected expert identity, then the call is connected to the expert, such that the expert is required to authenticate an identity before providing service to a call from the hold queue.

24 Claims, 8 Drawing Sheets

U.S. PATENT DOCUMENTS

| | | | |
|---|---|---|---|
| 5,937,044 A | 8/1999 | Kim | 379/121.05 |
| 5,940,476 A | 8/1999 | Morganstein et al. | 379/88.02 |
| 5,946,386 A | 8/1999 | Rogers et al. | 379/265.09 |
| 5,946,654 A | 8/1999 | Newman et al. | 704/246 |
| 5,978,467 A | 11/1999 | Walker et al. | 379/266 |
| 6,038,305 A | 3/2000 | McAllister et al. | 379/201.02 |
| 6,049,602 A * | 4/2000 | Foladare et al. | 379/265.04 |
| 6,049,603 A | 4/2000 | Schwartz et al. | 379/309 |
| 6,058,364 A | 5/2000 | Goldberg et al. | 704/55 |
| 6,064,730 A | 5/2000 | Ginsberg | 379/265.09 |
| 6,101,242 A | 8/2000 | McAllister et al. | 379/88.02 |
| 6,122,357 A | 9/2000 | Farris et al. | 379/207 |
| 6,125,178 A | 9/2000 | Walker et al. | 379/211.01 |
| 6,178,230 B1 | 1/2001 | Borland | 379/67.1 |
| 6,236,722 B1 | 5/2001 | Gilbert et al. | 379/230 |
| 6,263,066 B1 | 7/2001 | Shtivelman et al. | 379/266 |
| 6,381,329 B1 | 4/2002 | Uppaluru et al. | 379/266.04 |
| 6,522,743 B1 | 2/2003 | Hurd | 379/266.04 |
| 6,535,492 B2 | 3/2003 | Shtivelman | 370/270 |
| 6,792,102 B2 * | 9/2004 | Shires | 379/265.04 |
| 6,826,173 B1 | 11/2004 | Kung et al. | 370/352 |
| 6,826,276 B2 | 11/2004 | Brown et al. | 379/265.02 |
| 6,842,767 B1 | 1/2005 | Partovi et al. | 709/203 |
| 6,845,155 B2 | 1/2005 | Elsey | 379/266.04 |
| 2003/0031309 A1 | 2/2003 | Rupe et al. | 379/265.02 |
| 2003/0103621 A1 | 6/2003 | Brown et al. | 704/9 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

* cited by examiner

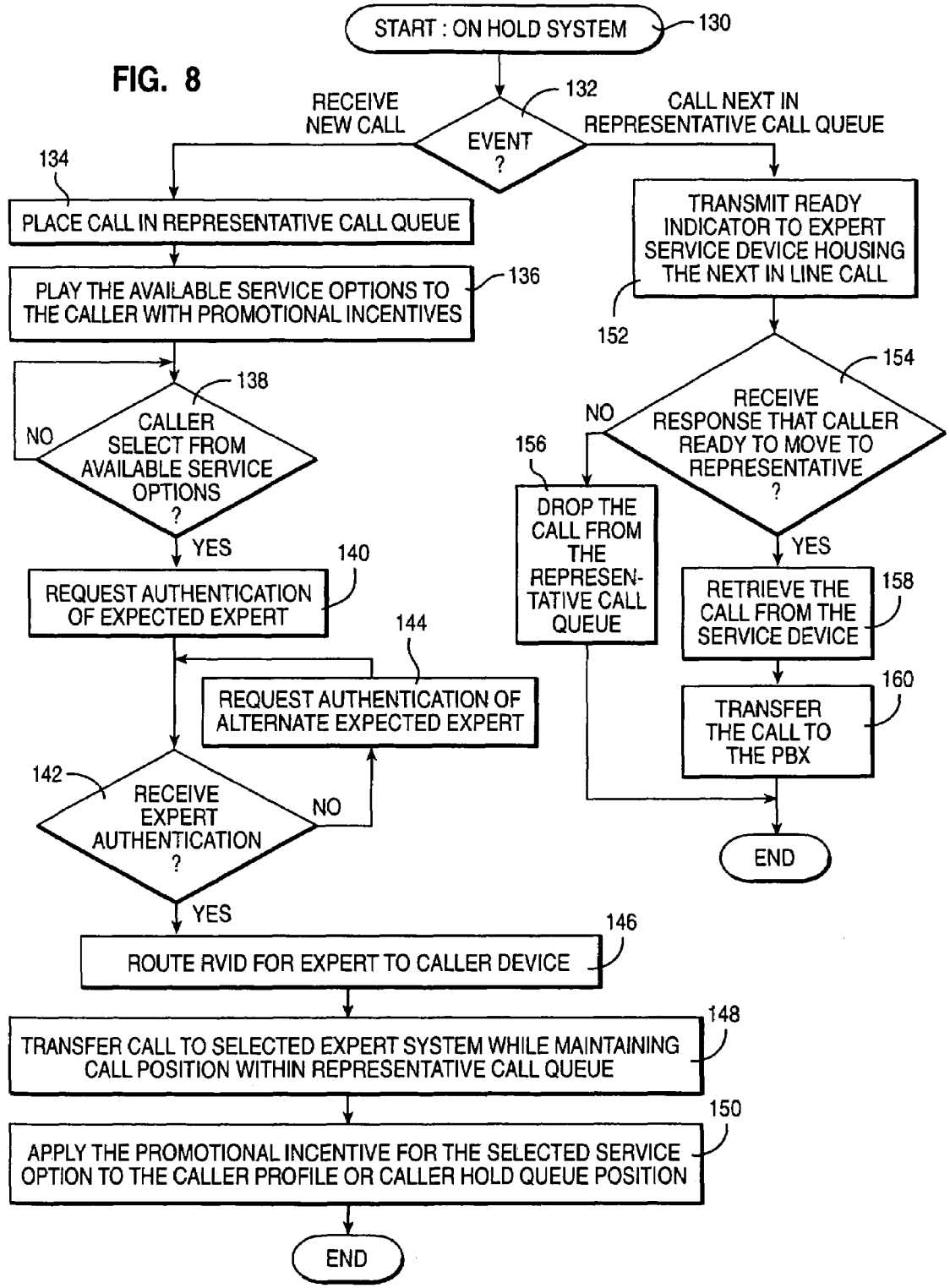

MANAGING USE OF EXPERTS BY CALLERS WAITING IN A HOLD QUEUE

CROSS-REFERENCE TO RELATED APPLICATIONS

This application is a divisional of commonly assigned U.S. patent application Ser. No. 10/015,383, filed Dec. 12, 2001 now U.S. Pat. No. 7,139,390, titled "Promoting Use of Experts to Callers Waiting in a Hold Queue", which is hereby incorporated herein by reference.

BACKGROUND OF THE INVENTION

1. Technical Field

The present invention relates in general to telecommunications and, in particular, to call hold centers. Still more particularly, the present invention relates to managing use of experts by callers waiting within a hold queue.

2. Description of the Related Art

Many companies provide telephone-based access to help staff, sales personnel, representatives, and automated menus via a call center. Where high telephone call traffic is typical in telephone access to a company's representatives, a PBX system receives the call and distributes the call to an automatic call distributor (ACD), thus incorporating a hold function in the call center. ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. In order to alleviate frustrations, before a call is placed in a hold queue, a greeting message identifying the called party is played by the ACD, via an interactive voice response unit (IVRU), to the caller, indicating that the next available agent will service the call. During the holding period, music or advertising messages may be played to the caller to entertain or inform the caller of sales promotions for particular products or services. More enhanced ACD systems may offer additional services to callers, such as news, multiple selections of music, release to make additional phone calls, games while on hold, and other services that make on hold time more pleasant.

Alternatively, enhanced ACD systems may attempt to provide a caller with the information needed without the caller having to wait to speak with a representative. For example, an ACD system may allow a caller waiting in a call queue to monitor(but not participate in) other caller conversations with similar queries. In addition, an ACD system may allow a caller waiting in a call queue to listen to previous conversations with representatives with similar queries. However, while these features may provide information to a caller, the caller is still limited to hearing conversations of other callers and not receiving a direct answer to the caller's own question. Where that direct answer is still needed, the caller must still wait for an available representative.

Therefore, in view of the foregoing, it would be advantageous to provide a method, system, and program for placing a call on hold in a first queue in a call center, but allowing a caller to select to speak with an expert while waiting on the call to be answered by a representative of the call center. By speaking with an expert, it is hoped that a caller's question would be answered and the caller would not need to wait in the hold queue.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for managing use of experts by callers waiting within a hold queue.

According to one aspect of the present invention, a call on hold in a hold queue is transferred to an expert system responsive to a request by the caller to speak with an expert. Then, responsive to detecting an answer by a party at the expert system, an authentication of the identity of the answering party is required. If the authenticated identity of the answering party matches an expected expert identity, then the call is connected to the expected expert, such that the expected expert is required to authenticate the expert's identity before providing service to a call from the hold queue.

A call transferred to an expert system may be answered by one of multiple experts accessible via the expert system. In particular, the call transferred to an expert system may be answered by one of multiple experts that meet the criteria for answering the call. An expected expert may also be another caller currently on hold in the hold queue.

The expert identity authentication may be performed in a switching network performing the connection of the call between the hold queue and the expert system. Alternatively, the expert identity authentication may be performed at the expert system or at the call center housing the hold queue. Further, a third party authentication service may perform the expert identity authentication.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 depicts a high level logic flowchart of a process and program for controlling an on hold system in accordance with the method, system, and program of the present invention.

DETAILED DESCRIPTION OF THE PREFERRED EMBODIMENT

Figure 1:
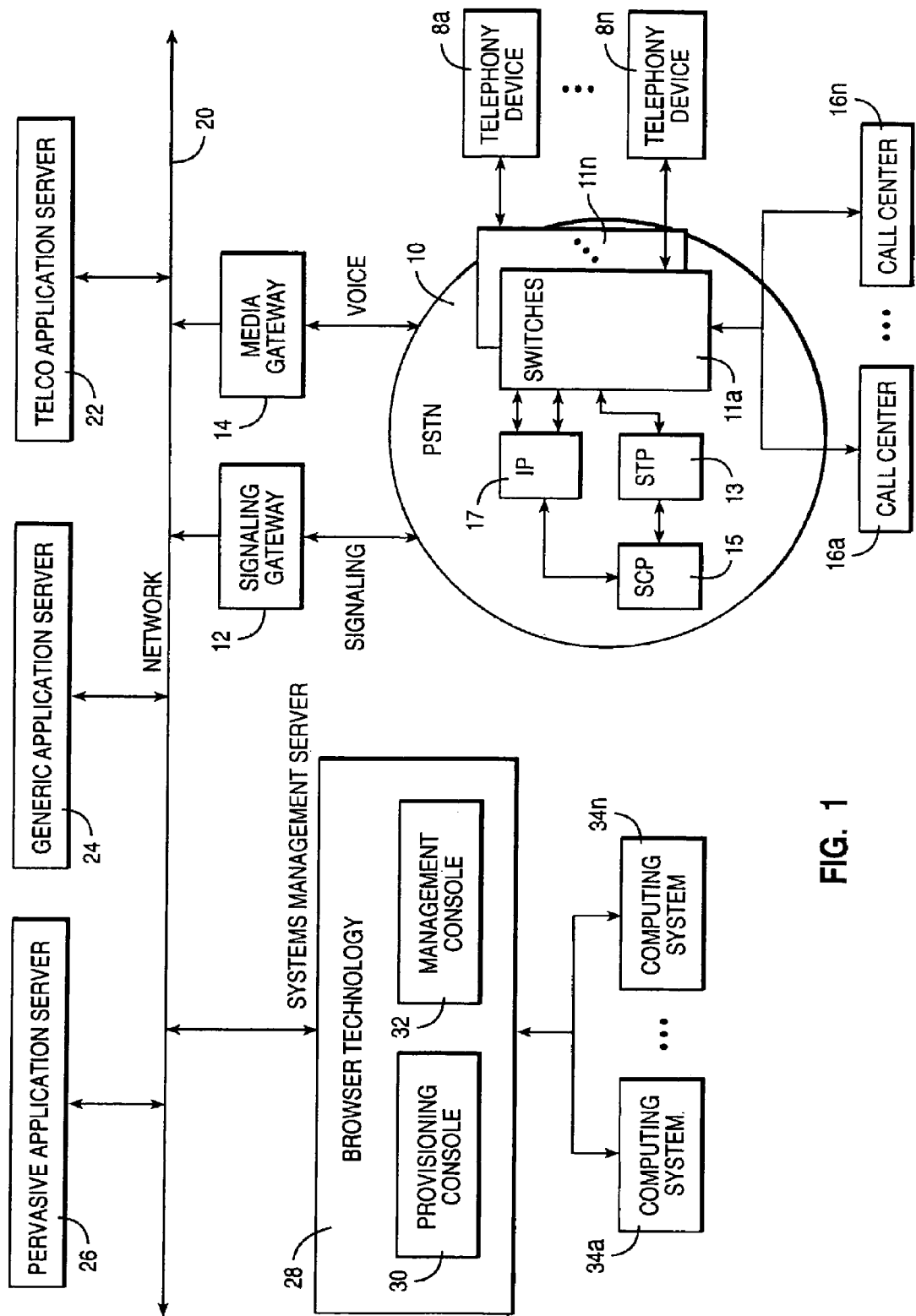
FIG. 1 illustrates a block diagram of a telecommunications network in which the present invention may be implemented.

A method, system, and program for promoting use of experts by callers waiting in a hold queue are provided. For purposes of the present invention, when a call is received at a call center and all representatives are busy, the call is placed in an on hold system associated with a call center. The on hold system places the call in a hold queue that determines the order in which calls are answered by representatives. Advantageously, while the call is on hold in the on hold system, the call may be passed on to an expert, such that the caller may receive answers to questions with out the need to wait for a representative. However, when the call is next in line to be answered by a representative, the caller may choose whether to remain at the expert or speak to a representative.

For purposes of the present invention, experts may include, but are not limited to, freelance experts that work as third party consultants for answering individual caller questions, group experts that manage multiple callers concurrently, and emergency experts that are skilled in a single emergency type of area when a high volume of questions are being detected in that area. Experts may provide services at a cost to the on hold system, at a cost to the caller, or at no cost.

Use of experts by callers waiting in a hold queue may be promoted by providing incentives for callers to utilize experts and by authenticating the identity of experts give callers an identification of the person and skills of the person acting as an expert.

In particular, incentives may be provided in the form of hold queue position adjustment points, financial incentives, and reward point incentives. In addition, incentives may adjust according to the time of day or volume of calls. Moreover, incentives may adjust according to a caller's record.

In addition, in particular, in authenticating the identity of an expert, and in particular a freelance expert, the on hold system can verify that the person acting as an expert is in fact qualified. In addition, the caller has a record of the expert utilized for accountability. In addition to registered agents, freelance experts may also include other individuals who are waiting in a hold queue who happen to have an expertise in a particular area.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information from one service provider to the next without security features.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably acceses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably acceses the consoles of systems management server 28 via the Internet utilizing a computing system, such as computing systems 34a-34n.

The subscriber profile may be accessed at systems management server 28 by other external servers and PSTN 10 via network 8. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other biometric methods. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

PSTN Identity Authentication and Call Control

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP initiates an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a-11n may also send voice and signaling messages to intelligent peripherals (IP) 17 via voice trunks and signaling channels. IP 17 provides enhances announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other biometric methods.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15. In addition, as previously described, caller authentication to determine VIDs and RVIDs may be performed by a third party, such as telco application server 22.

An origin telephony device or destination telephony device may also determine a VID and/or RVID for the caller and/or callee of a call. In particular, telephony devices 8a-8n and call centers 16a-16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee is output to a display in association with a call. In addition, other context information about the caller including, but not limited to, the device from which the call originates or is answered, ratings for a caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber's line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, when a central office switch detects an off-hook condition on a line, the central office switch will then determine if a VID signal is transferred from the off-hook telephony device. If a VID is transferred, then a query is made to SCP 15 according to the VID for any services specified for the authenticated subscriber. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

Alternatively, if a VID signal is not transferred from the off-hook telephony device, then the central office switch will provide a dial tone and transfer the call to an IP that prompts the caller to provide a voice entry or other identification. Alternatively, the central office switch may transfer the call to telco application server 22 for use of the caller authentication service. In either case, the identity for the subscriber is preferably authenticated, the call is transferred back to the central office switch, services are provided according to the VID authenticated for the subscriber, and the call is routed according to dialed digits from the off-hook line terminal.

In addition, an RVID may be provided in the present invention to authenticate the identity of a callee receiving the call. When a call is answered, the call is transferred back to an IP or telco application server 22 to authenticate the identity of the callee answering the call. In the present invention, authentication of the callee is particularly advantageous where the callee is an expert, and in particular a freelance expert. Therefore, authentication of the callee may also be performed by the on hold system or the expert system receiving the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

Call Center Environment

Figure 2:
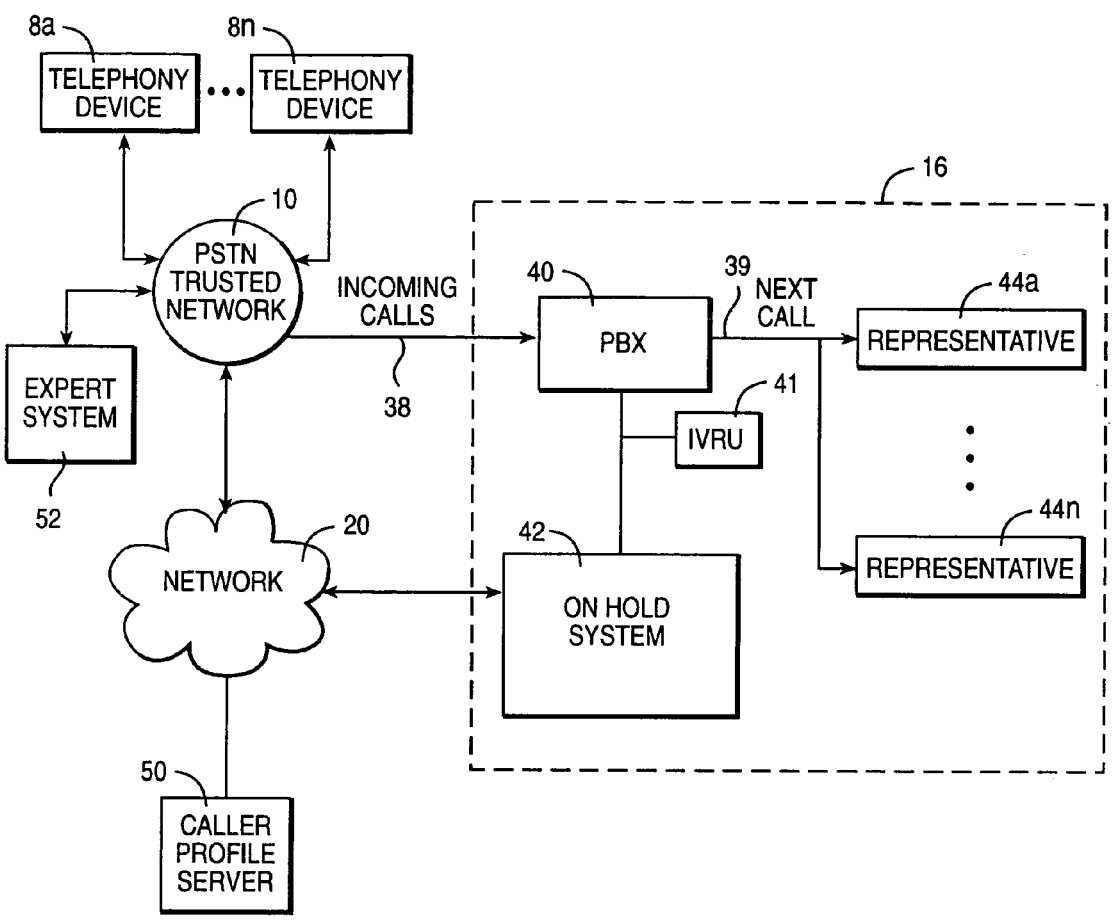
FIG. 2 depicts a block diagram of a network call or contact center system in which the present invention may be implemented.

Referring now to FIG. 2, there is an illustrative network call center environment in which the present invention may be implemented. It will be appreciated by one with skill in the art that although a particular call center environment is described below, the invention is not limited to use within the described network environment, rather, the inventive queue position advancement process may be implemented within any on-hold information service regardless of the telephony environment.

As illustrated, multiple incoming calls are received at a call center 16a. In particular, a connection 38 includes a voice trunk and a signal link, such that both voice and VID signals may be received at PXB 40 from PSTN 10. Connection 38 is preferably connected to PSTN 10 via a wireline, wireless, Internet Protocol network, or other connection. PBX 40 distributes incoming calls to multiple representative terminals 44a-44n via connection 39, wherein connection 39 also includes a voice trunk and a signal link. In particular, PBX systems, and in particular PBX systems with automatic call distribution (ACD) ability, are well known in the art as switching systems designed to received telephone calls destined for call center 16a and to queue those call when a call handling agent is not available.

In the description which follows, it will be asumed that all representative terminals 44a-44n are busy and therefore PBX 40 cannot respond to an incoming call by making a direct connection to one of representative terminals 44a-44n. As a result, PBX 40 is forced to place the incoming call on hold. However, an advantage of the present invention is that when a call is transferred to one of representative terminals 44a-44n, the VID for the call is also transferred, enabling a representative to receive an authenticated identity of a caller. Additional authentication may be required by PBX 40 where callers are accessing sensitive information from representatives.

After placing the incoming call on hold, the VID, time of call, and other information received by PBX 40 are forwarded to on hold system 42. On hold system 42 preferably creates a record based on the call and positions the call within one of call queues 46a-46n. In particular, the call queue selected for a call is specified by a caller indication of the subject matter of a call. In addition, a single call queue may be utilized to store all calls on hold.

While in the present embodiment PBX 40 forwards calls to a single on hold system, in alternate embodiments, PBX 40 may forward calls to multiple on hold systems and to multiple call centers. In addition, on hold system 42 and other on hold systems may be coupled to PBX 40 or may be remotely accessed by PBX 40. Further, while in the present embodiment on hold system 42 is depicted as an independent system, on hold system 42 may also be incorporated within PBX 40.

While the call is on hold, an interactive voice response unit (IVRU) 41, coupled to PBX 40 and on hold system 42, may offer the caller a menu of available options for receiving call hold queue information for on hold system 42. In general, IVRU 41 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within on hold system 42. For purposes of the present invention, prompts to the caller may be in voice, text, video, and/or graphical formats depending on the interface receiving the prompt. In addition, for purposes of the present invention, a voice browser may be implemented to interact with a caller.

A caller provide associated with a VID may be accessed by on hold system 42 from a caller profile server 50, via a network 20. On hold system 12 may then use the caller profile to specify the menu of available expert options and other services provided to the caller while on hold. In addition, a caller profile may include other information about a caller that may be shared acros multiple call centers according to a single VID.

According to one advantage of the present invention, the menu of available expert options may further include general promotional incentives for selecting from among the expert options. The general promotional incentives may vary dependent upon variables such as the volume or calls or may vary for each caller based on the caller's profile. For example, a caller profile may indicate that a caller averages five times the amount of time with a representative as the average for the call center. In that case, a larger incentive may be provided to that caller to select to speak with a freelance expert or participate in a group expert session, in hopes of the caller receiving answers to questions prior to speaking with a representative.

According to another advantage of the present invention, the identity of the expert answering a call is preferably authenticated and an RVID returned to the telephony device from among telephony devices 8a-8n that placed a call. In providing authentication, not only is the identity of the expert authenticated, but the skill level of the expert is verified and compared with a required skill level designated at the call center. In particular, some experts, such as group and emergency experts, may connect to on hold system 42 via an intranet, wherein authentication of the expert identity is performed by on hold system 42 or the telephony device utilized by the expert. Other experts, particularly freelance experts, may connect to on hold system 42 via network 20, wherein authentication of the expert identity may be performed by PSTN 10, a third party service system(telco application server), or on hold system 42.

Figure 3:
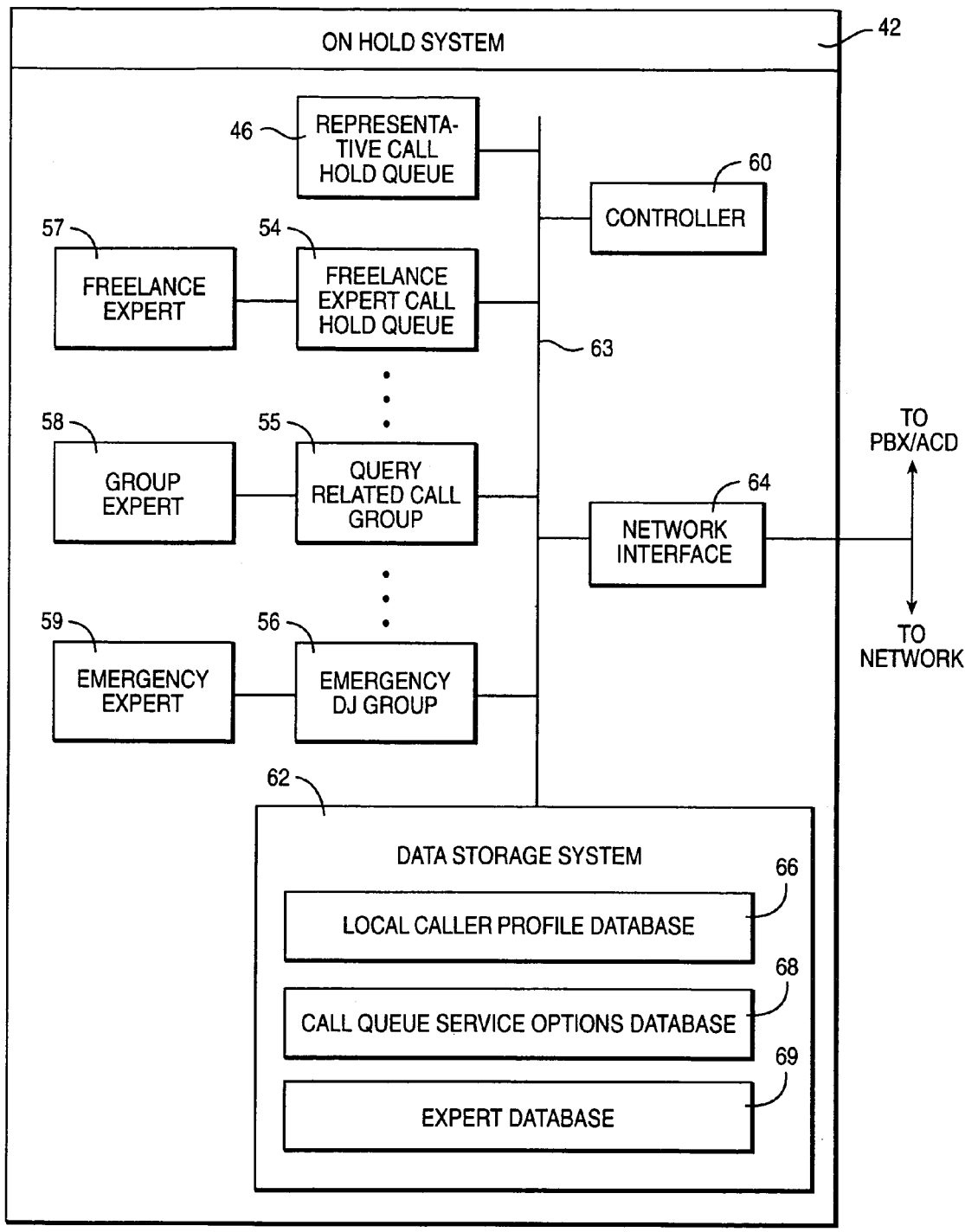
FIG. 3 illustrates a block diagram of an on hold system in accordance with the method, system, and program of the present invention.

With reference now to FIG. 3, there is an illustrative block diagram of an on hold system in accordance with the method, system, and program of the present invention. As illustrated, on hold system 42 includes a controller 60, a representative call hold queue 46, a network interface 64, and a data storage system 62 communicatively connected via a bus 63. In addition, on hold system 42 includes a freelance expert call hold queue 54, a query related call group 55, and an emergency DJ group 56 communicatively connected via bus 63. Additional systems may be connected along bus 36 that are not depicted herein. In particular, controller 60 comprises conventional computer resources including, but are not limited to, at least one processor, memory, a data storage system, system software and application software, that function together to perform the functions described with reference to controller 60.

Network interface 64 preferably communicates with PBX 10 and network 20 via a telephone network or other networking system. In particular, network interface 64 receives transfers of calls from PBX 10 and then returns calls to PBX 10 when a call is the next in line within representative call hold queue 46.

When a call is received at on hold system 42, the call is preferably recorded in representative call hold queue 46 and held in a call holding infrastructure therein. Then, while a call is holding within representative call hold queue 46, the caller is preferably prompted by IVRU 41 to select from the multiple available service options designated in call queue service options database 68.

However, according to an advantage of the present invention, the service options are first filtered according to the caller profile associated with the VID of the call, such that the caller is only presented with those options that are specifically designated by the caller and those options which are tailored to the caller according to the caller profile. For example, if a caller profile indicates that the caller does not want to be offered freelance expert options, the service options are tailored accordingly. The caller profile may be accessed according to VID from caller profile server 50 and/or local caller profile database 66.

In addition, according to another advantage of the present invention, the service options may also be supplemented with promotional incentives. Such promotional incentives may be immediately applicable upon selection of a service option or may require the caller to participate with the expert for a particular amount of time before application. Some incentives, such as a hold queue position incentive, are applied to the hold queue position of a caller. Other incentives, such as financial incentives or reward program point incentives, may be applied the caller profile to be utilized by the caller at a later time.

According to one menu selection, a caller may select to be connected to one of multiple available freelance experts. Freelance experts may register with call centers to help in designated areas of skill. Callers may select from one of multiple freelance experts in a particular area, depending on a specific skill or ratings of the expert provided by previous callers. Freelance experts may charge a caller for a particular service or may be supplemented by the call center.

For example, for a caller to select from freelance experts, the caller may first enter the topic of the caller query. Then, the caller is prompted to select from among the freelance experts able to handle the query. In particular, a caller may indicate a preference to receive ratings or other information about each expert by a keypad or voice entry.

In the present embodiment, when a caller selects a freelance expert, the call is routed to the freelance expert system. In the present embodiment, the freelance expert system may be remote from on hold system 42, such as expert system 52. In addition, in the present embodiment, freelance expert system may be local to on hold system 42, such as freelance expert call hold queue 54 that holds calls intended for freelance expert 57.

In particular, by providing the caller with the option to speak with a freelance expert, the caller may receive help in addition to that which would be provided by the representative. For example, companies that sell computer hardware typically only provide support for hardware and limited software issues. Callers with software questions beyond that provided by the company, but intertwined with a hardware issue, may receive help from a freelance expert specializing in the both the hardware and software. Such help would not be available from the company representative who is only trained to handle company specific hardware problems.

Another type of expert includes group experts who entertain questions within a particular query topic from multiple callers on hold. Each group expert is preferably skilled in at least one of the particular query topics and advantageously is able to manage multiple query topics, such that if no callers are interested in a particular query topic then the group expert assigned to that query topic can help manage questions for another query topic.

In the embodiment, one query related call group 55 is displayed, where callers transferred to the group can communicate with one another and with an expert communicating via group expert device 58. Query related call group 55 may include a conferencing calling system that allows multiple callers to participate in a broadcasted conversation.

In order to manage the conversation in query related call group 55, callers may indicate a readiness to ask a question by a keypad or voice entry. The readiness indicator is then placed in a queue that controls the order in which callers are connected to a group broadcast.

A further type of expert includes an emergency DJ expert, where callers have the option to select an emergency DJ expert discussing an emergency query topic that is the main concern of callers. In the embodiment, an emergency DJ group 56 is illustrated, where callers transferred to the group can log a question in a queue to be answered in order by a DJ expert who reads the question to the group and then answers the question. Emergency DJ group 56 may include a broadcasting system that enables a DJ expert to broadcast to multiple callers in the group via emergency expert device 59.

In particular, an emergency DJ expert option is particularly advantageous in lieu of playing a pre-recorded static message to all callers about an emergency, where those callers then continue to wait to speak to a representative or are left with an unsatisfactory opinion of an organization or company. For example, where a product defect has been discovered and the number of calls into a call center increases due to callers concerned about the product defect, callers may wait to speak individually to a representative, however while waiting may be included in a general session managed by an emergency DJ expert for dealing with the current subject receiving "emergency attention" by a call center. Rather than just receiving a pre-recorded message about the product defect, callers can voice complaints, ask questions, and receive answers from the emergency DJ expert. While the emergency DJ expert may respond to callers with pre-written statements, callers will still feel like they have been heard in addition to receiving valuable information.

In addition, an emergency DJ expert option is particularly advantageous where an emergency is developing. For example, where a traffic accident has occurred and multiple witnesses call in to report the accident, an emergency DJ expert may be implemented for the accident such that the callers all speak to one expert in the accident. The witnesses can also work with the expert as a group to fill in the details of the physical emergency.

Further, an emergency DJ expert option is particularly advantageous where training multiple representatives to have expertise in a particular area is not timely or cost effective. Moreover, by allowing callers to receive answers to questions in a group setting, callers then will not wait to talk individually to a representative, thus freeing representatives to deal with fewer questions related to the emergency.

As a further advantage, controller 30 may monitor the query topics of current conversations with representatives to determine what topics constitute "emergencies" within the call center. Emergencies may be determined by the most common topic of questions. Controller 30 may then automatically establish an emergency DJ group for that most common topic. Alternatively, in response to a physical emergency or an action occurring for which a call center may expect an increase in callers, a new emergency DJ group may quickly be created to handle the increase in traffic.

Prior to connection to an expert, on hold system 12 may require authentication of the identity of an expert to whom a call will be transferred. In particular, expert database 69 includes voice samples from registered experts and the skill levels associated with those experts. In addition, ratings from other callers of each expert may be maintained in expert database 69 according to the VID of the expert.

In order to require authentication of the identity of an expert, on hold system 42 preferably initiates a communication with the expert that requests a voice sample from the expert. The voice sample is then analyzed in the PSTN, on hold system 42 or a third party system to authenticate the identity of the expert in an RVID. The expert profile for the RVID is preferably accessed either from caller profile server 50, an expert profile server, PSTN 10, on hold system 42, or a database management server connected to network 20. The profile preferably indicates the skill level of the expert, which may then be compared with the skill level required of the expert for transfer of a particular call.

Where a call is transferred to another hold queue to be answered by an expert, on hold system 42 may attach acceptable RVIDs to a VID of a call, such that the call is returned to the on hold system if the expert answering the calls from the expert hold queue does not match an acceptable RVID. Alternatively, rather than transferring the call to the expert system, a request to answer the call may be transferred and placed in an expert hold queue, such that when the request is next in line, the authentication of the expert to answer the call is performed. In particular, in cases where multiple experts may answer calls from a single expert queue, placing a request, rather than the call itself, is advantageous. Moreover, while the call remains at on hold system 42, the caller may engage in other activities until the expert is available.

Figure 4:
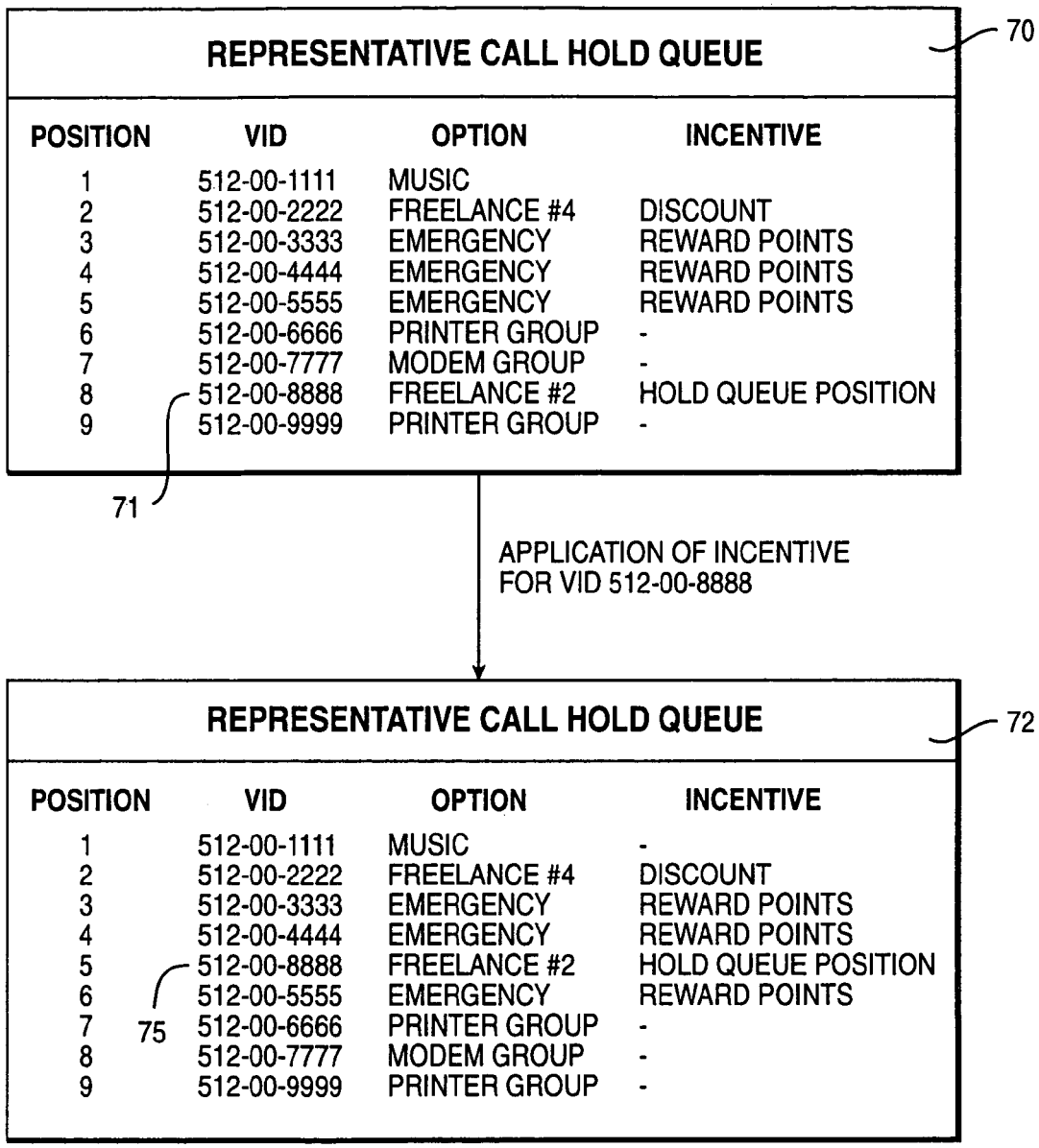
FIG. 4 depicts an illustrative embodiment of a hold queue in accordance with the method, system, and program of the present invention.

With reference now to FIG. 4, there is an illustrative embodiment of a hold queue in accordance with the method, system, and program of the present invention. As depicted, a representative call hold queue 70 includes records for calls currently on hold within an on hold system.

In particular, the position within the queue, the caller ID, and the service option selected by the caller, and incentive promoted for the service option are stored in representative call hold queue 60. In alternate embodiments, additional information including, but not limited to, the time of arrival, the time on hold, the time at a particular option, and other information about each call may be stored in representative call hold queue 60.

According to one advantage of the present invention, an incentive for selecting an expert option may include adjustment of position within the hold queue. In the example, the caller in position "8", as indicated by numerical indicator 71, has selected to transfer to an expert, where the incentive for such a transfer is an adjustment in queue position, in addition to the natural adjustment of position as calls are answered. Block 72 indicates the ordering of the representative call hold queue after the application of the queue position adjustment for the caller. In particular, the caller has moved from position "8" to position "5", while the other callers have not advanced, and the callers from position "5" on are moved back a position.

Figure 5:
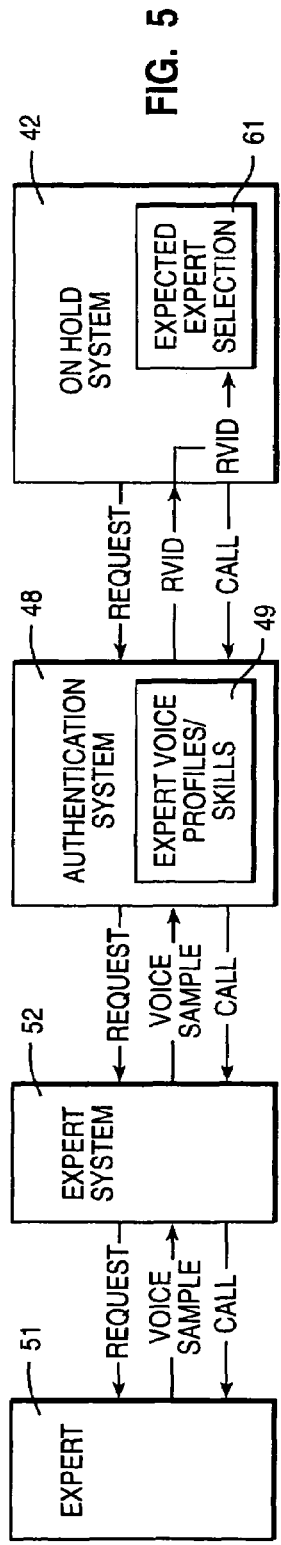
FIG. 5 illustrates a block diagram of an expert authentication system in accordance with the method, system, and program of the present invention.

Referring now to FIG. 5, there is depicted a block diagram of an expert authentication system in accordance with the method, system, and program of the present invention. As illustrated, on hold system 42 initiates a request for an authentication of the identity of the expert for a particular call. The request is preferably transferred to an authentication system 48, which may include a telco application server, an IP in the PSTN, on hold system 42, or other systems available for authentication. In particular, the particular call is preferably transferred to authentication system 48. Authentication system 48 initiates play of an audible and/or text based request for a voice identification to expert system 52. Expert system 52 routes the request to expert telephony device 51.

The expert preferably responds by entering a voice identification via expert telephony device 51, that is transferred via expert system 52 to authentication system 48. Authentication system 48 then determines an RVID for the voice identification and transfers the RVID to on hold system 42. In particular, in determining the RVID for the voice identification, an identifier, such as a name, may be detected from the voice identification. The identifier is then looked up in a database 49 that includes voice profiles utilized to verify identifiers. In addition, for experts, skill levels are linked to the voice profiles.

On hold system 42 may first access a profile for the RVID that indicates the level of skill of the expert. Alternatively, the RVID may include an indication of the skill level of the expert included by authentication system 48.

An expected experts selection 61 indicates either a skill level required of experts or identity for specific experts that may answer a call. Advantageously, if the skill level associated with an RVID or the identity included in the RVID matches expected experts selection 61, then the call proceeds. In particular, expected experts selection 61 may only include a single expected expert or multiple expected experts.

Figure 6:
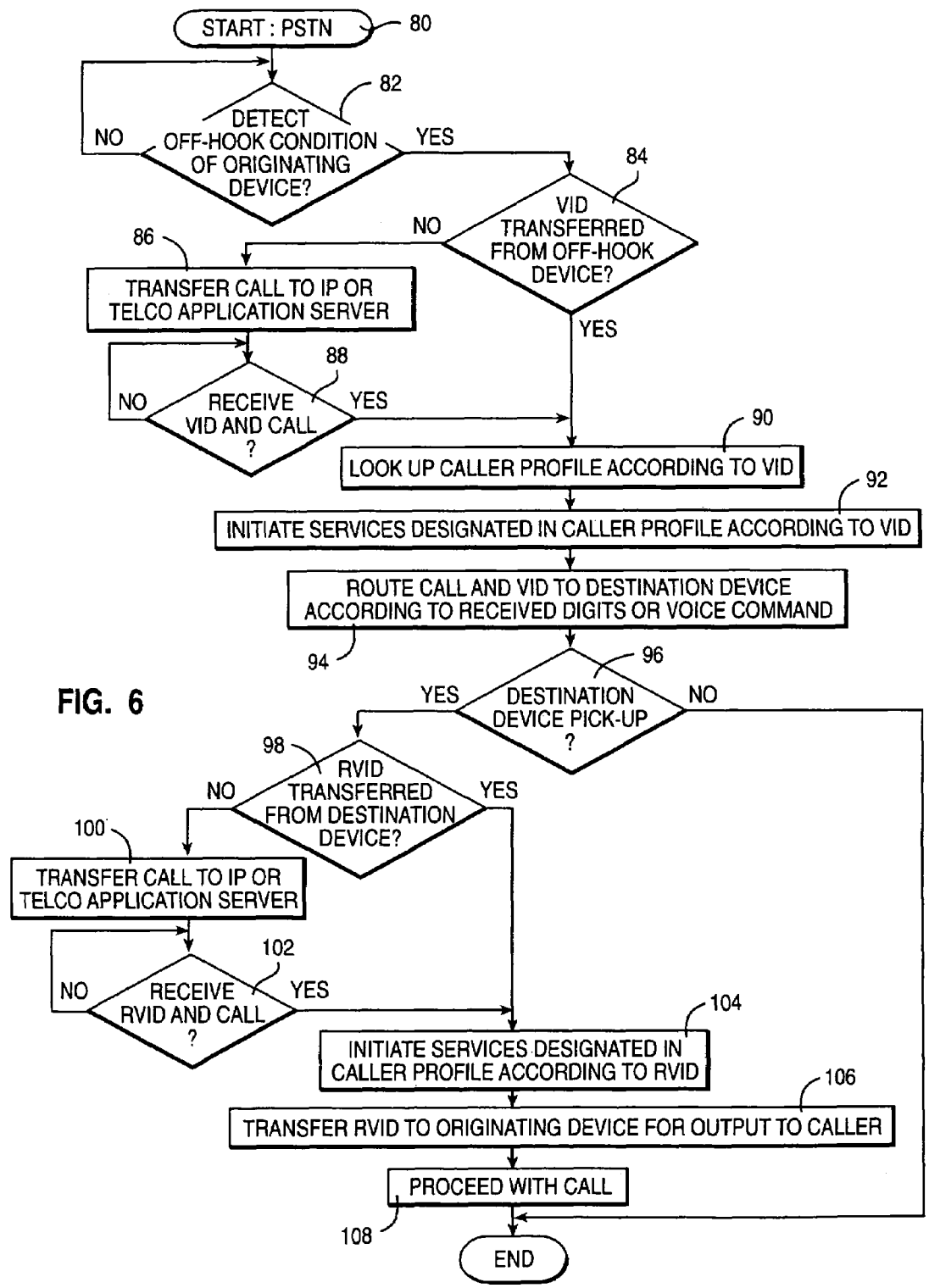
FIG. 6 depicts a high level logic flowchart of a process and program for controlling a switching network in accordance with the method, system, and program of the present invention.

With reference now to FIG. 6, there is depicted a high level logic flowchart of a process and program for controlling a switching network in accordance with the method, system, and program of the present invention. As illustrated, the process starts at block 80 and thereafter proceeds to block 82.

Block 82 illustrates a determination as to whether an off-hook condition is detected in association with an originating telephony device. If an off-hook condition is not detected, then the process iterates at block 82. If an off-hook condition is detected, then the process passes to block 84.

Block 84 depicts a determination as to whether a VID is transferred from the off-hook device. The originating telephony device may authenticate an identity for a caller. However, the PSTN or other servers connected thereto may require additional authentication within a trusted network for access to certain types of services. If a VID is received and no additional authentication is required, then the process passes to block 90. If a VID is not received or if the PSTN requires additional authentication, then the process passes to block 86. Block 86 illustrates transferring the call to an intelligent peripheral or a telco application server for authentication. Block 88 depicts a determination as to whether the VID and the call are returned to the switching center. If not, then the process iterates at block 88. If the VID and the call are returned, then the process passes to block 90.

Block 90 depicts looking up the caller profile according to VID. The caller profile may be stored in a database within the PSTN, in an extended network to the PSTN or in a network external to the PSTN. Next, block 92 illustrates initiating services designated in the caller profile retrieved according to the VID. Thereafter, block 94 depicts routing the call and the VID to a destination device according to received digits or a voice command, and the process passes to block 96.

Block 96 illustrates a determination as to whether the destination device is detected with a pick-up (off-hook) condition. If the destination device does not pick-up, then the process ends. If the destination device does pick-up, then the process passes to block 98.

Block 98 depicts a determination as to whether an RVID is transferred from the destination device. If the RVID is transferred, then the process passes to block 104. If not, then the process passes to block 100. Block 100 illustrates transferring the call to an intelligent peripheral or telco application server. Next, block 102 depicts a determination as to whether an RVID and call are received back at the switching center. If not, then the process iterates at block 102. When the RVID and call are received, then the process passes to block 104.

Block 104 illustrates initiating services designated in a caller profile associated with the RVID. Next, block 106 depicts transferring the RVID to the originating device for output to the caller. Thereafter, block 108 illustrates proceeding with the call, where additional services are applied when applicable, and the process ends. In addition, in the present invention, the RVID may be compared with a list of expected expert RVIDs, such that the call only proceeds if the expert meets designated expectations.

Figure 7:
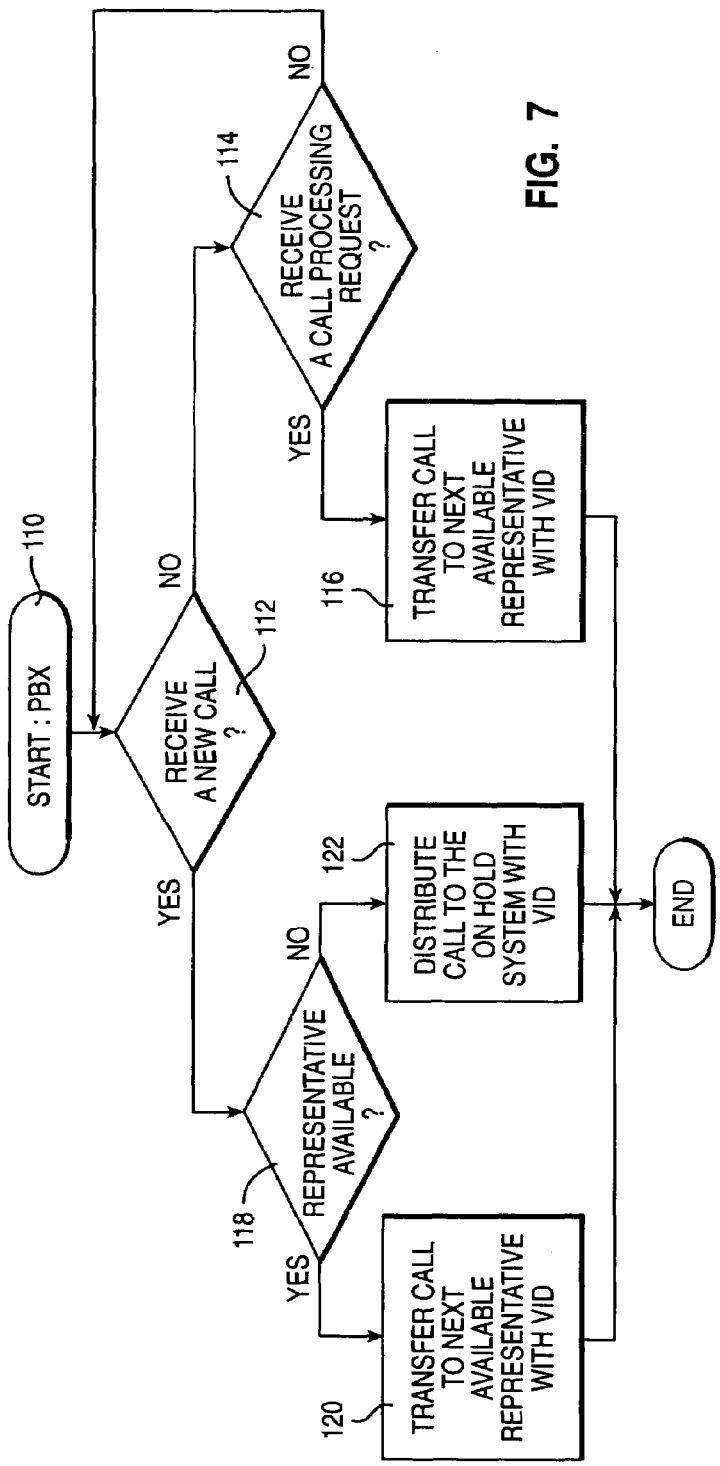
FIG. 7 illustrates a high level logic flowchart of a process and program for controlling a PBX in accordance with the method, system, and program of the present invention.

With reference now to FIG. 7, there is depicted a high level logic flowchart of a process and program for controlling a PBX system within a call center in accordance with the method, system, and program of the present invention. As illustrated, the process starts at block 110 and thereafter proceeds to block 112.

Block 112 depicts a determination as to whether a new call is received. If a new call is received, then the process passes to block 118. If a new call is not received, then the process passes to block 114. Block 114 illustrates a determination as to whether or not a call processing request is received. When a call is at the top of the call queue, the call is preferably transferred back to the PBX with a call processing request. If a call processing request is not received, then the process passes to block 112. If a call process request is received, then the call is transferred to the next available representative with a VID, as depicted at block 116, and the process ends.

Block 118 illustrates a determination as to whether or not a representative is available. If a representative is available, then the call is transferred to the next available representative with a VID, as illustrated at block 120, and the process ends. If a representative is not available, then the process passes to block 122. Block 122 illustrates distributing the call to the on hold system with the VID, and the process ends.

Referring now to FIG. 8, there is illustrated a high level logic flowchart of a process and program for controlling an on hold system in accordance with the method, system, and program of the present invention. As depicted, the process starts at block 130 and thereafter proceeds to block 132.

Block 132 illustrates a determination as to the type of event that occurred when an event occurs. If a new call is received, then the process passes to block 134. If a call is the next in line to be transferred to a representative, then the process passes to block 152.

Block 134 depicts placing the call in the representative call queue. Next, block 126 illustrates playing the available service options to the caller with specified promotional incentives. A caller profile may be accessed in order to specify promotional incentives. In addition, promotional incentives may be specified according to other factors, such as the current call volume. Thereafter, block 138 depicts a determination as to whether a caller has selected from the available service options. The process iterates at block 138 until an option is selected and then passes to block 140.

Block 140 illustrates requesting authentication of an expected expert. In particular, requesting authentication may include transferring the call to an authentication system. Next, block 142 depicts a determination as to whether an expert authentication is received. If an expert authentication is not received, then a request for authentication of an alternate expected expert is depicted at block 144, and the process passes to block 142. If an expert authentication is received, then the process passes to block 146.

Block 146 depicts routing the RVID for the expert to the caller device. Next, block 148 illustrates transferring the call to the selected expert system while maintaining call position within the representative call queue. Thereafter, block 150 depicts applying the promotional incentive for the selected service option to the caller profile or caller hold queue position, and the process ends.

Block 152 illustrates transmitting a ready indicator to the expert service device housing the next in line call. Next, block 154 depicts a determination as to whether a response is received that the caller is ready to move to the representative. If a ready response is not received, then the call is dropped from the representative call queue, as depicted at block 156, and the process ends. If a ready response is received, then the process passes to block 158.

Block 158 depicts retrieving the call from the expert service device. Next, block 160 illustrates transferring the call to the PBX and advancing the call, and the process ends.

Figure 9:
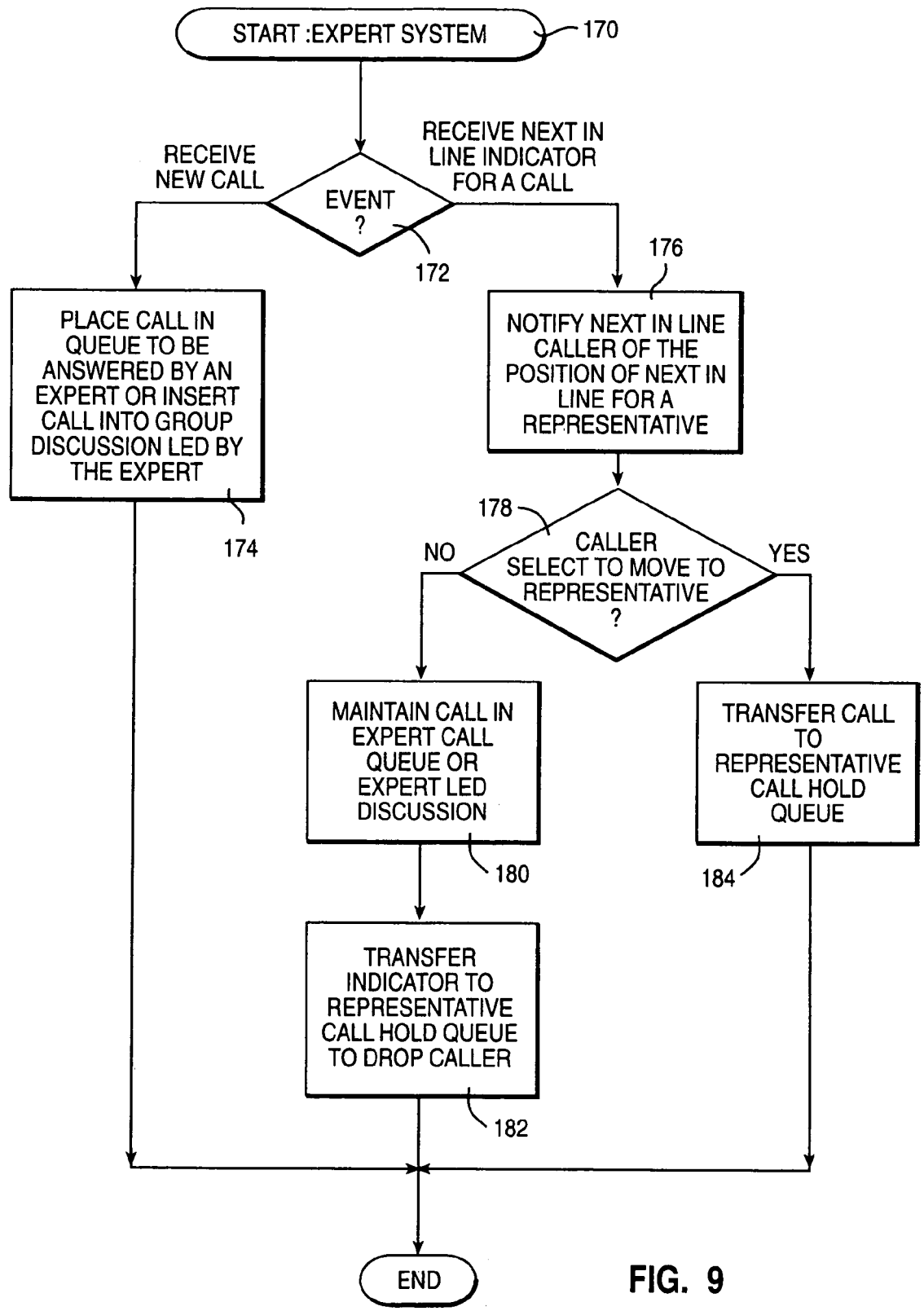
FIG. 9 illustrates a high level logic flowchart of a process and program for controlling an expert system in accordance with the method, system, and program of the present invention.

With reference now to FIG. 9, there is depicted a high level logic flowchart of a process and program for controlling an expert system in accordance with the method, system, and program of the present invention. As illustrated, the process starts at block 170 and thereafter proceeds to block 152.

Block 172 depicts a determination as to the type of event that occurred when an event occurs. If a new call is received, then the call is placed in a queue to be answered by an expert or the call is inserted in a call group led by an expert, depending on the type of expert service selected, at block 174, and the process ends. In particular, the expert may be required to authenticate the expert's identity prior to actually receiving the new call. In addition, where multiple experts are available to answer the call, a request call may be received from an on hold system, where when the request call is next in line, an authentication of the identity of the expert answering the request call is transferred to the on hold system, and a new call is returned from the on hold system. If a next in line indicator is received for a call, the process passes to block 176.

Block 176 illustrates notifying the next in line caller of the next in line position for a representative. Next, block 178 depicts a determination as to whether the caller selects a readiness of move to the representative. If the caller selects a readiness, then the call is transferred to the representative call hold queue, as depicted at block 184, and the process ends. If the caller does not select a readiness, then the process passes to block 180. Block 180 depicts maintaining the call in the expert call queue or expert led group. Next, block 182 illustrates transmitting an indicator to the representative call hold queue to drop the caller, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for managing a plurality of experts comprising:
   transferring a call on hold in a hold queue to an expert system;
   responsive to detecting an answer at said expert system, requiring authentication of an identity of a party answering said call by requesting an audio input from a callee providing said answer at said expert system;
   identifying an identifier from said audio input;
   verifying said audio input with said identifier according to stored voice samples for said identifier;
   transferring said identifier and an expert profile associated with said identifier as said authenticated identity of said expected expert; and
   responsive to said authenticated identity matching an expected expert identity, connecting said call to said expected expert, such that said expected expert is required to provide said authenticated identity to provide service to said call from said hold queue.

2. The method for managing a plurality of experts according to claim 1, wherein transferring a call further comprises:
   responsive to a request by a caller of said call to speak with said expected expert, transferring said call to said expert system.

3. The method for managing a plurality of experts according to claim 1, wherein said expected expert is one of a plurality of experts meeting a particular criteria.

4. The method for managing a plurality of experts according to claim 1, wherein said expected expert is one of a plurality of experts accessible via said expert system.

5. The method for managing a plurality of experts according to claim 1, wherein said expected expert is another caller currently on hold in said hold queue.

6. The method for managing a plurality of experts according to claim 1, further comprising:
   performing said authentication of said identity in a switching network performing the connection of said call between said hold queue and said expert system.

7. The method for managing a plurality of experts according to claim 1, further comprising:
   performing said authentication of said identity in said expert system.

8. The method for managing a plurality of experts according to claim 1, further comprising:
   performing said authentication of said identity in a call center housing said hold queue.

9. The method for managing a plurality of experts according to claim 1, further comprising:
   performing said authentication of said identity at a third party authentication service server accessible via a network connected to said hold queue.

10. A system for managing a plurality of experts comprising:
    a call center comprising a hold queue;
    means for transferring a call on hold in a hold queue to an expert system;
    means responsive to detecting an answer at said expert system, for requiring authentication of an identity a party answering said call by requesting an audio input from a callee providing said answer at said expert system;

means for identifying an identifier from said audio input;

means for verifying said audio input with said identifier according to stored voice samples for said identifier;

means for transferring said identifier and an expert profile associated with said identifier as said authenticated identity of said expected expert; and means responsive to said authenticated identity matching an expected expert identity, for connecting said call to said expected expert, such that said expected expert is required to provide said authenticated identity to provide service to said call from said hold queue.

11. The system for managing a plurality of experts according to claim 10, wherein said means for transferring a call further comprises:

means responsive to a request by a caller of said call to speak with said expected expert, for transferring said call to said expert system.

12. The system for managing a plurality of experts according to claim 10, wherein said expected expert is one of a plurality of experts meeting a particular criteria.

13. The system for managing a plurality of experts according to claim 10, wherein said expected expert is one of a plurality of experts accessible via said expert system.

14. The system for managing a plurality of experts according to claim 10, wherein said expected expert is another caller currently on hold in said hold queue.

15. The system for managing a plurality of experts according to claim 10, further comprising:

means for performing said authentication of said identity in a switching network performing the connection of said call between said hold queue and said expert system.

16. The system for managing a plurality of experts according to claim 10, further comprising:

means for performing said authentication of said identity in said expert system.

17. The system for managing a plurality of experts according to claim 10, further comprising:

means for performing said authentication of said identity in a call center housing said hold queue.

18. The system for managing a plurality of experts according to claim 10, further comprising:

means for performing said authentication of said identity at a third party authentication service server accessible via a network connected to said hold queue.

19. A computer program product for managing a plurality of experts residing on a recordable-type computer readable medium comprising instructions which when executed on a computer system cause the computer system to:

control transfer of a call on hold in a hold queue to an expert system;

require authentication of an identity a party answering said transferred call by requesting an audio input from a callee providing said answer at said expert system;

identify an identifier from said audio input:

verify said audio input with said identifier according to stored voice samples for said identifier;

transfer said identifier and an expert profile associated with said identifier as said authenticated identity of said expected expert; and connect said call to said expert system responsive to said authenticated identity matching an expected expert identity.

20. The computer program product for managing a plurality of experts according to claim 19, wherein the computer-readable program when executed on a computer further causes the computer to:

control transfer of said call to said expert system according to a request by said caller to speak with said expected expert.

21. The computer program product for managing a plurality of experts according to claim 19, wherein the computer-readable program when executed on a computer further causes the computer to:

perform said authentication of said identity in a switching network performing the connection of said call between said hold queue and said expert system.

22. The computer program product for managing a plurality of experts according to claim 19, wherein the computer-readable program when executed on a computer further causes the computer to:

perform said authentication of said identity in said expert system.

23. The computer program product for managing a plurality of experts according to claim 19, wherein the computer-readable program when executed on a computer further causes the computer to:

perform said authentication of said identity in a call center housing said hold queue.

24. The computer program product for managing a plurality of experts according to claim 19, wherein the computer-readable program when executed on a computer further causes the computer to:

perform said authentication of said identity at a third party authentication service server accessible via a network connected to said hold queue.

* * * * *